(12) United States Patent
Girton

(10) Patent No.: US 7,066,802 B1
(45) Date of Patent: Jun. 27, 2006

(54) PRE-CUT CRAB LEGS, ARMS AND CLAWS

(75) Inventor: Michael Henry Girton, Seattle, WA (US)

(73) Assignee: Admiralty Island Fisheries, Inc., Seattle, WA (US)

( * ) Notice: Subject to any disclaimer, the term of this patent is extended or adjusted under 35 U.S.C. 154(b) by 0 days.

(21) Appl. No.: 11/210,971

(22) Filed: Aug. 24, 2005

(51) Int. Cl.
*A22C 29/02* (2006.01)

(52) U.S. Cl. .......................................... 452/1
(58) Field of Classification Search ................ 452/1–7
See application file for complete search history.

(56) References Cited

U.S. PATENT DOCUMENTS 4,019,224 A * 4/1977 Amaria et al. .................. 452/1
4,021,886 A * 5/1977 Crepeau ......................... 452/1
5,542,877 A * 8/1996 Taylor ............................ 452/7
5,586,931 A * 12/1996 Williams, Jr. .................. 452/6

* cited by examiner

*Primary Examiner*—Thomas Price
(74) *Attorney, Agent, or Firm*—Mann Law Group

(57) ABSTRACT

A pre-cut crab appendage, such as a leg, arm or claw, is provided by forming two substantially linear diametrically opposed cuts through the exterior shell portion of the appendage substantially along the length thereof. The cuts permit the shell of the appendage to be removed easily and conveniently from the fleshy interior by facilitating the separation of the exterior shell into two well-defined halves. The cuts are preferably formed in the appendage after the appendage is separated from the crab and before the appendage is frozen and/or cooked. Preferably, the cuts are formed by hand using a knife. Preferably, the crab legs are obtained from a King Crab or Snow Crab.

10 Claims, 1 Drawing Sheet

US 7,066,802 B1

PRE-CUT CRAB LEGS, ARMS AND CLAWS

FIELD OF THE INVENTION

This invention relates generally to seafood products and more particularly to crab legs, arms and claws and methods of processing such legs, arms and claws before sale to restaurant patrons and other retail consumers.

BACKGROUND OF THE INVENTION

Seafood is an increasingly popular food item the world over. Crabs, including King Crab (Lithodes Aequispinus, Paralithodes Camtschaticus and Paralithodes Platypus), Snow Crab (Chionoecetes Angulatus, Chionoecetes Baridi, Chionoecetes Opilio, Chionoecetes Tanneri and Chionoecetes Japonicus) and other species, are found throughout the world and primarily in the waters off Russia, the USA, Canada and Norway. Crabs, and in particular King Crab and Snow Crab, are a highly popular, much sought after delicacy. Such crab are typified by having large concentrations of highly flavorful meat in their legs, arms and claws. Typically, after capture, the appendages of such crabs are separated from the remainder of the body and sold to consumers. Typically, although not necessarily, the legs, arms and claws are pre-cooked and/or frozen before retail sale.

As with all crustaceans, King, Snow and other sought after crabs have an external skeleton in the form of an exterior shell containing the muscles and internal organs within. Given their size, the exterior shells of sought-after crabs can make it difficult for consumers to get at the edible meat contained therein. This is particularly true in the case of King and Snow Crabs, where the bulk of the edible meat is contained in the legs, arms and claws. It is, therefore, necessary to crack the shells before eating—a sometimes messy, difficult and potentially dangerous undertaking. To alleviate this problem, the legs of King, Snow and other crab are sometimes pre-cracked before retail sale. This is typically accomplished using a crushing type operation that introduces cracks into the exterior shell of the legs in a more-or -less random manner. Although effective, the random nature of the cracks sometimes makes it difficult for consumers effectively to remove the shell without either encountering difficulty or damaging the underlying meat. Accordingly, there remains room for improvement in the way King, Snow and other crab legs, arms and claws are processed before distribution to consumers.

SUMMARY OF THE INVENTION

The invention provides a pre-cut crab appendage including an interior fleshy portion and an exterior shell. A first cut is formed substantially through the exterior shell of the appendage and extends substantially along the length of the appendage along one side thereof. A second cut is formed substantially through the exterior shell of the appendage substantially along the length of the appendage along the other side thereof.

The invention also provides a method of producing a pre-cut crab appendage including the steps of obtaining an appendage from a crab wherein the appendage includes an interior fleshy portion and an exterior shell. The method further includes the step of forming a fist cut substantially through the exterior shell of the appendage extending substantially along the length of the appendage along one side thereof. The method further includes the step of forming a second cut substantially through the exterior shell of the appendage substantially along the length of the appendage along the other side thereof.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements and wherein:

DETAILED DESCRIPTION

Figure 1:
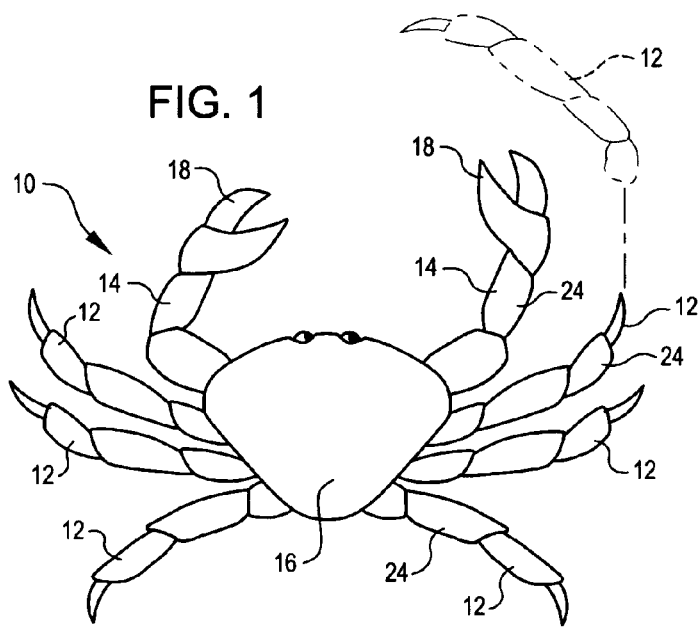
FIG. 1 is a top plan view of a representative crab prior to being processed in accordance with one aspect of the invention.

Referring to the drawings and in particular to FIG. 1, a representative crab 10 suitable for use with the invention is shown. As illustrated, the crab 10 includes numerous appendages 10, includes six legs 12 and two arms 14 extending outwardly from a central body 16. A pair of claws 18 are carried at the ends of the two arms 14. For illustrative purposes, the crab 10 is a King Crab. It will be appreciated, however, that the particular type of crab is not critical and that other crabs and crustaceans can be used as well.

The legs 12, as well as the arms 14, body 16 and claws 18, each include a hard exterior shell 20 that protects the muscle 22 (FIG. 3) and internal organs contained within. Each leg 12 and arm 14 includes a plurality of articulated segments 24 that permit the legs 12 and arms 14 to flex and to move relative to the body 16.

Figure 2:
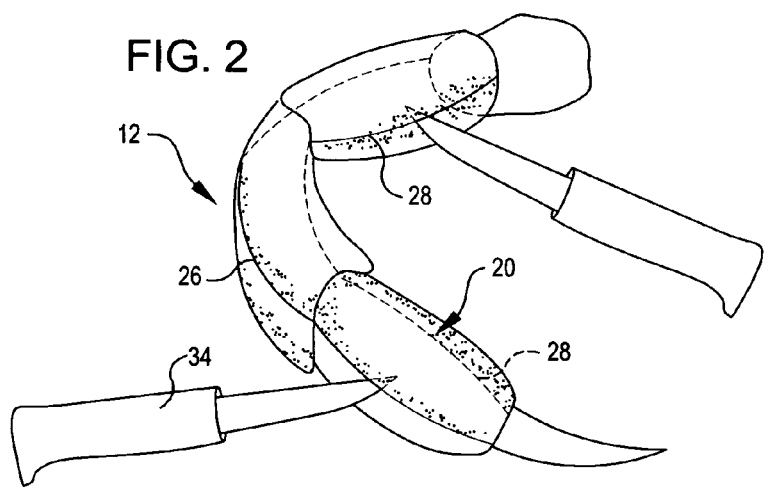
FIG. 2 is a perspective view of an appendage removed from the crab shown in FIG. 1, showing the crab leg being processed in accordance with one aspect of the invention.
Figure 3:
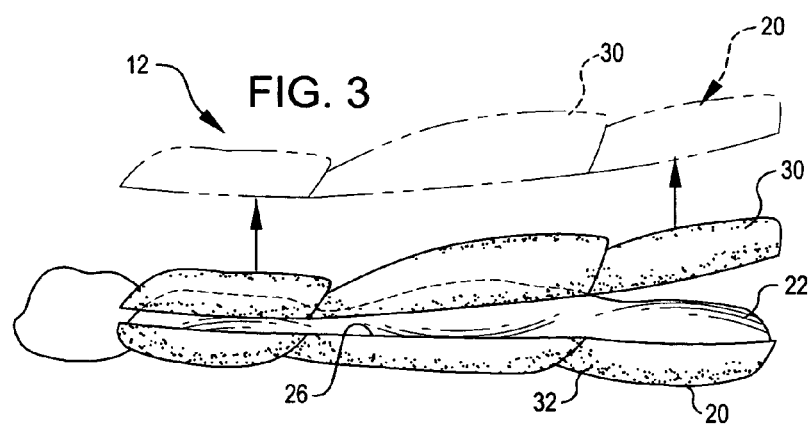
FIG. 3 is a perspective view of the crab appendage shown in FIG. 3 showing the manner in which the exterior shell of the appendage can easily and efficiently be removed after the appendage is processed in accordance with one aspect of the invention.

As shown in FIG. 2, the crab 10 is processed by separating the legs 12, arms 14 and claws 18 from the body 16. To facilitate removal of the shell 20 and enhance access to the edible flesh 22 contained therein, the exterior shell 20 of each leg 12, arm 14 and claw 18 includes a pair of slits or cuts 26, 28 formed along its length along two lines generally diametrically opposed to each other. Preferably, the cuts 26, 28 lie generally in a plane passing more-or -less through the longitudinal center of the appendage. It will be appreciated that the precise location of these cuts 26, 28 is not critical, and the goal of the slitting is to divide the shell 16 into two halves 30, 32 that can be easily separated from each other as best illustrated in FIG. 3.

As shown in FIG. 2, the two cuts or slits 26, 28 are preferably made by hand using a sharp knife 34 or similar implement. Alternatively, automated machinery can be used to make the cuts 26, 28 as well. The cuts 26, 28 can be made one at a time. Alternatively, and to save time, the cuts 26, 28 can be made simultaneously. It will be appreciated that still other methods can be used to form the cuts or slits 26, 28.

Preferably, the cuts 26, 28 are made shortly after the crab 10 is killed and before the legs 12, arms 14 and claws 18 are cooked and/or frozen.

Because of the adhesion of the musculature 22 to the interior of the shell 20, the crab legs 12, as well as each arm and claw structure 14, 16 will remain a unitary structure after the slitting or cutting process and even following cooking. However, because the exterior shell 16 has been cut along the two lines 26, 28 as shown, the consumer need not crack or break the shell 20 further and can gain access to the edible meat 22 simply by pulling the two sections 30, 32 of shell 20 away from each other as shown in FIG. 3. The adhesion of the meat 22 to the shell 20 is easily overcome, and the meat can be readily removed from the shell after the sections of shell are separated.

Although the invention finds particular use with King Crab and Snow Crab legs, arms and claws, it will be appreciated that the invention is not so limited in its broader aspects and that other types of crabs and/or appendages can be used. It will also be appreciated that the precise location and orientation of the cuts are also not critical to the invention in its broader aspects, the goal being to permit easy separation of the shell from the interior flesh.

While a particular embodiment of the invention has been shown and described, it will be apparent to those skilled in the art that changes and modifications can be made without departing from the invention in its broader aspects, and, therefore, the aim in the appended claims is to cover all such changes and modifications as fall within the true spirit and scope of the invention.

What is claimed is:

1. A pre-cut appendage comprising:
    an appendage obtained from a crab, said appendage including an interior fleshy portion and an exterior shell having a plurality of articulated segments;
    a first cut formed substantially through said exterior shell of said appendage extending substantially along the longitudinal length of said appendage about one side thereof; and
    a second cut formed substantially through said exterior shell of said appendage substantially along the longitudinal length of said appendage about the other side thereof,
    wherein, after cutting the shell into two sections, said pre-cut crab appendage will retain its unitary structure due to the adhesion of the musculature to the interior of the shell so as to allow a consumer to gain access to the interior fleshy portion by pulling the two sections away from each other.

2. A pre-cut crab appendage as defined in claim 1 wherein said appendage includes a longitudinal axis and wherein said first and second cuts extend generally parallel to said longitudinal axis.

3. A pre-cut crab appendage as defined in claim 2 wherein said cuts are substantially diametrically opposed across said appendage.

4. A pre-cut crab appendage as defined in claim 3 wherein said cuts are substantially linear.

5. A pre-cut crab appendage as defined in claim 1 wherein said appendage is selected from the group comprising legs, arms and claws.

6. A pre-cut crab appendage as defined in claim 1 wherein said crab appendage is frozen after said first and second cuts are formed.

7. A pre-cut crab appendage as defined in claim 1 wherein said first and second cuts are made by hand using a knife.

8. A pre-cut crab appendage as defined in claim 1 wherein said first and second cuts are made by hand using a knife.

9. A pre-cut crab appendage as defined in claim 1 wherein said first and second cuts are made substantially simultaneously.

10. A pre-cut crab appendage as defined in claim 1 wherein said crab is selected from the group comprising King Crab and Snow Crab.

\* \* \* \* \*